(12) United States Patent
Lei et al.

(10) Patent No.: US 10,986,609 B2
(45) Date of Patent: Apr. 20, 2021

(54) DEVICE-TO-DEVICE TRANSMISSION

(71) Applicant: Lenovo Innovations Limited (Hong Kong), Hong Kong (CN)

(72) Inventors: Haipeng Lei, Beijing (CN); Xiaodong Yu, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 16/323,101

(22) PCT Filed: Aug. 3, 2016

(86) PCT No.: PCT/CN2016/093154
§ 371 (c)(1),
(2) Date: Feb. 4, 2019

(87) PCT Pub. No.: WO2018/023511
PCT Pub. Date: Feb. 8, 2018

(65) Prior Publication Data
US 2019/0166584 A1    May 30, 2019

(51) Int. Cl.
*H04W 72/02* (2009.01)
*H04W 76/14* (2018.01)
*H04L 5/00* (2006.01)

(52) U.S. Cl.
CPC ........... *H04W 72/02* (2013.01); *H04L 5/0053* (2013.01); *H04W 76/14* (2018.02)

(58) Field of Classification Search
CPC ...... H04W 72/02; H04W 76/14; H04L 5/0053
See application file for complete search history.

(56) References Cited

U.S. PATENT DOCUMENTS

| | | | | |
|---|---|---|---|---|
| 7,130,806 B1* | 10/2006 | Bera | ...................... | G06Q 10/02 705/5 |
| 9,504,041 B2* | 11/2016 | Lim | ...................... | H04L 1/1861 |
| 9,730,092 B2* | 8/2017 | Jung | ...................... | H04L 5/0053 |
| 10,085,236 B2* | 9/2018 | Yoon | ...................... | H04W 4/80 |
| 10,321,470 B2* | 6/2019 | Ro | ...................... | H04W 72/02 |

(Continued)

FOREIGN PATENT DOCUMENTS

CN      105453695 A      3/2016
WO      2011088609 A1    7/2011

(Continued)

OTHER PUBLICATIONS

PCT ISA "International Search Report", dated Apr. 10, 2017, pp. 1-3.

(Continued)

*Primary Examiner* — Dominic E Rego
(74) *Attorney, Agent, or Firm* — Kunzler Bean & Adamson

(57) ABSTRACT

Apparatuses, methods, and systems are disclosed for device-to-device transmission. One apparatus includes a processor that generates a first signal indicating a first sequence and a first resource pool. Transmission of the first sequence within the first resource pool indicates a behavior of a first device that transmits the transmission of the first sequence. Moreover, the first resource pool is configured for use by multiple devices. The apparatus also includes a transmitter that transmits the first signal to the first device.

23 Claims, 8 Drawing Sheets

(56) References Cited

U.S. PATENT DOCUMENTS

| | | | |
|---|---|---|---|
| 2003/0118974 A1* | 6/2003 | Obrador | G09B 23/28 434/236 |
| 2004/0070962 A1* | 4/2004 | Schremmer | H05K 5/0269 361/816 |
| 2005/0195906 A1* | 9/2005 | Showmake | H04L 25/0226 375/260 |
| 2006/0132448 A1* | 6/2006 | Irons | G09B 5/00 345/169 |
| 2007/0136621 A1* | 6/2007 | Alon | G06F 1/10 713/503 |
| 2007/0182588 A1* | 8/2007 | Yanase | G08G 1/096783 340/905 |
| 2008/0085718 A1* | 4/2008 | Kuchibhotla | H04W 72/042 455/452.1 |
| 2009/0089606 A1* | 4/2009 | Songer | G06F 1/3265 713/340 |
| 2009/0310698 A1* | 12/2009 | Agarwal | H04L 5/0007 375/267 |
| 2010/0069079 A1* | 3/2010 | Higuchi | H04W 16/10 455/450 |
| 2012/0239821 A1* | 9/2012 | Hozumi | H04L 67/125 709/238 |
| 2013/0070816 A1* | 3/2013 | Aoki | H04W 72/046 375/219 |
| 2013/0077582 A1* | 3/2013 | Kim | H04W 74/002 370/329 |
| 2013/0173149 A1* | 7/2013 | Lu | G01C 21/32 701/410 |
| 2013/0184592 A1* | 7/2013 | Venetianer | G08B 21/043 600/476 |
| 2013/0210460 A1* | 8/2013 | Subramanian | B61L 25/025 455/456.3 |
| 2014/0010172 A1 | 1/2014 | Wei et al. | |
| 2014/0016574 A1* | 1/2014 | Seo | H04L 5/0051 370/329 |
| 2014/0045556 A1* | 2/2014 | Subramanian | B61L 25/025 455/574 |
| 2014/0070962 A1* | 3/2014 | Holland | G08G 1/0965 340/902 |
| 2014/0301228 A1* | 10/2014 | Kwak | H04W 8/005 370/252 |
| 2014/0355070 A1* | 12/2014 | Murakawa | H04N 1/00222 358/400 |
| 2015/0146692 A1* | 5/2015 | Yi | H04W 36/24 370/331 |
| 2015/0264552 A1* | 9/2015 | Xiong | H04W 8/005 370/329 |
| 2015/0326362 A1* | 11/2015 | Xiong | H04W 4/70 370/336 |
| 2016/0021625 A1* | 1/2016 | Li | H04W 72/0446 370/336 |
| 2016/0021664 A1* | 1/2016 | Chou | H04W 52/0229 370/329 |
| 2016/0094326 A1* | 3/2016 | Moon | H04L 5/0091 370/330 |
| 2016/0094895 A1* | 3/2016 | Stadelmeier | H04L 1/0009 725/33 |
| 2016/0095061 A1* | 3/2016 | Vainapel | H04W 52/0225 370/311 |
| 2016/0110528 A1* | 4/2016 | Gupta | H04L 63/08 726/19 |
| 2016/0142478 A1* | 5/2016 | Miyazaki | A61B 5/0022 709/204 |
| 2016/0183253 A1* | 6/2016 | Merlin | H04W 74/0808 370/329 |
| 2016/0204952 A1* | 7/2016 | Du | H04L 67/2823 340/12.53 |
| 2016/0234787 A1* | 8/2016 | Liu | H04W 52/06 |
| 2016/0277944 A1* | 9/2016 | Bhushan | H04L 5/0044 |
| 2016/0278706 A1* | 9/2016 | Okamoto | A61B 5/0013 |
| 2016/0302231 A1* | 10/2016 | Chien | H04W 72/042 |
| 2016/0344693 A1* | 11/2016 | Wetterwald | H04L 61/103 |
| 2016/0352787 A1* | 12/2016 | Kato | H04L 63/083 |
| 2016/0359599 A1* | 12/2016 | Sun | H04W 72/121 |
| 2017/0012683 A1* | 1/2017 | Bharadwaj | H04L 5/0007 |
| 2017/0041773 A1* | 2/2017 | Fujishiro | H04W 76/14 |

FOREIGN PATENT DOCUMENTS

| | | |
|---|---|---|
| WO | 2013117128 A1 | 8/2013 |
| WO | 2015109773 A1 | 7/2015 |

OTHER PUBLICATIONS

PCT ISA "Written Opinion of the International Searching Authority", dated Apr. 11, 2017, pp. 1-3.

ETSI, "LTE; Evolved Universal Terrestrial Radio Access (E-UTRA); Physical channels and modulation (3GPP TS 36.211 version 12.6.0 Release 12)", ETSI TS 136 211 V.12.6.0, Jul. 2015, pp. 1-138.

ETSI, "LTE; Evolved Universal Terrestrial Radio Access (E-UTRA); Physical channels and modulation (3GPP TS 36.211 version 13.0.0 Release 13)", ETSI TS 136 211 V.13.0.0, Jan. 2016, pp. 1-143.

ETSI, "LTE; Evolved Universal Terrestrial Radio Access (E-UTRA); Multiplexing and channel coding (3GPP TS 36.212 version 13.0.0 Release 13)", ETSI TS 136 212 V.13.0.0, Jan. 2016, pp. 1-123.

* cited by examiner

DEVICE-TO-DEVICE TRANSMISSION

FIELD

The subject matter disclosed herein relates generally to wireless communications and more particularly relates to device-to-device transmission.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Downlink Control Information ("DCI"), Downlink ("DL"), Downlink Pilot Time Slot ("DwPTS"), Device-to-Device ("D2D"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Identification ("ID"), Licensed Assisted Access ("LAA"), Load Based Equipment ("LBE"), Listen-Before-Talk ("LBT"), Long Term Evolution ("LTE"), Negative-Acknowledgment ("NACK") or ("NAK"), Orthogonal Cover Code ("OCC"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Pedestrian-to-Vehicle ("P2V"), Quality of Service ("QoS"), Quadrature Phase Shift Keying ("QPSK"), Radio Resource Control ("RRC"), Random Access Procedure ("RACH"), Round Trip Time ("RTT"), Receive ("RX"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Vehicle-to-Pedestrian ("V2P"), Vehicle-to-Vehicle ("V2V"), Vehicle-to-Everything ("V2X"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, D2D communication may occur between two different UEs. For example, in some networks V2P and/or P2V communication may occur. In such networks, certain UEs may transmit and/or receive excessive communications. Such transmissions and/or receptions may use a large amount of battery and/or other resources.

BRIEF SUMMARY

Apparatuses for configuring device-to-device transmission are disclosed. Methods and systems also perform the functions of the apparatus. In one embodiment, the apparatus includes a processor that generates a first signal indicating a first sequence and a first resource pool. In such an embodiment, transmission of the first sequence within the first resource pool indicates a behavior of a first device that transmits the transmission of the first sequence. Moreover, the first resource pool is configured for use by multiple devices. In various embodiments, the apparatus includes a transmitter that transmits the first signal to the first device.

In one embodiment, the processor generates a second signal for indicating the first sequence and the first resource pool, and the transmitter transmits the second signal to a second device. In a further embodiment, the processor generates a third signal for indicating a second sequence and the first resource pool. In such an embodiment, transmission of the second sequence within the first resource pool indicates a behavior of a third device that transmits the transmission of the second sequence. Moreover, the processor generates a fourth signal for indicating the first sequence, the second sequence, and the first resource pool. Furthermore, the transmitter transmits the third signal to the third device, and transmits the fourth signal to the second device. In some embodiments, the first sequence and the second sequence are the same. In certain embodiments, one sequence in each subframe within the first resource pool is transmitted. In some embodiments, more than one sequence in each subframe within the first resource pool is transmitted.

In various embodiments, each resource within the first resource pool includes a gap in a subframe. In certain embodiments, each resource within the first resource pool includes a last symbol in a subframe. In one embodiment, the first resource pool is located in the last symbol in a subframe configured for the second device. In some embodiments, the first sequence is a reference signal. In various embodiments, the behavior includes the first device crossing a road.

A method for configuring device-to-device transmission, in one embodiment, includes generating a first signal indicating a first sequence and a first resource pool. In such an embodiment, transmission of the first sequence within the first resource pool indicates a behavior of a first device that transmits the transmission of the first sequence, and the first resource pool is configured for use by multiple devices. In some embodiments, the method includes transmitting the first signal to the first device.

In one embodiment, an apparatus includes a processor that generates a sequence, and selects a resource from a resource pool. In some embodiments, the apparatus includes a transmitter that transmits the sequence on the resource. In such embodiments, the transmission of the sequence on the resource indicates a behavior of the apparatus.

In one embodiment, the apparatus includes a receiver that receives a signal for indicating the sequence and the resource pool. In a further embodiment, the processor selects the resource randomly from the resource pool. In some embodiments, the sequence is preconfigured. In certain embodiments, the resource pool is preconfigured. In some embodiments, the behavior includes the apparatus crossing a road.

A method for device-to-device transmission, in one embodiment, includes generating a sequence. In some embodiments, the method includes selecting a resource from a resource pool. In certain embodiments, the method includes transmitting the sequence on the resource. In such embodiments, the transmission of the sequence on the resource indicates a behavior of an apparatus.

In one embodiment, an apparatus includes a receiver that, on each resource within a resource pool, detects whether a sequence is transmitted. In such an embodiment, transmission of the sequence within the resource pool indicates a behavior of a device that transmits the transmission of the sequence.

In some embodiments, the receiver receives a signal indicating the sequence and the resource pool. In certain embodiments, the apparatus includes a processor that generates a warning message if the sequence is transmitted. In various embodiments, the sequence is preconfigured. In one embodiment, the resource pool is preconfigured. In some embodiments, the behavior includes the device crossing a road.

In various embodiments, a method includes, on each resource within a resource pool, detecting whether a sequence is transmitted. In such embodiments, transmission of the sequence within the resource pool indicates a behavior of a device that transmits the transmission of the sequence.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
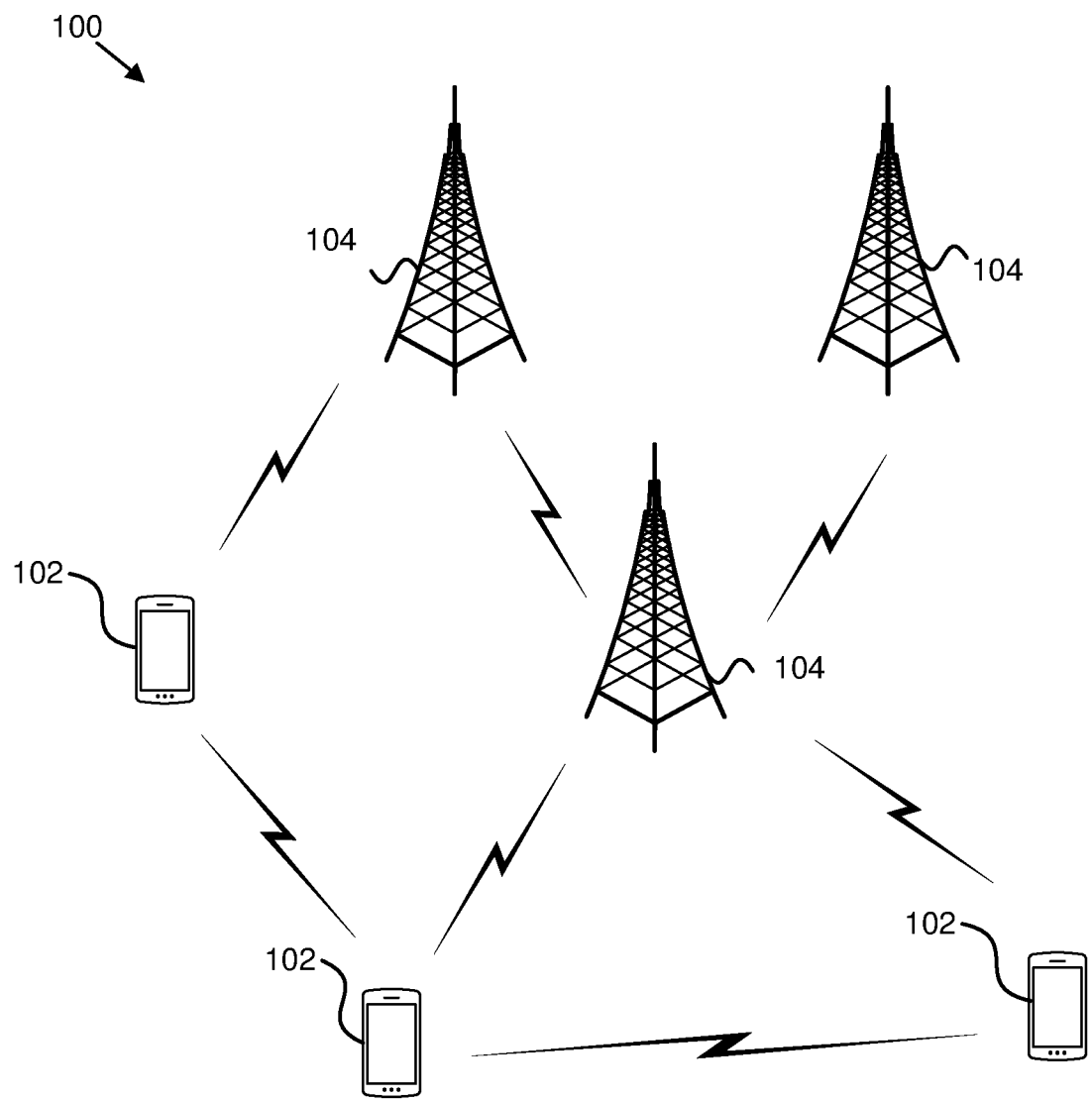
FIG. 1 is a schematic block diagram illustrating one embodiment of a wireless communication system for device-to-device transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for device-to-device transmission. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, a vehicle UE, a pedestrian UE, or by other terminology used in the art. The remote units 102 may communicate directly with one or more of the base units 104 via UL communication signals. Furthermore, the remote units 102 may communicate directly with other remote units 102.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may generate a first signal indicating a first sequence and a first resource pool. In such an embodiment, transmission of the first sequence within the first resource pool indicates a behavior of a first device that transmits the transmission of the first sequence, and the first resource pool is configured for use by multiple devices. In some embodiments, the base unit 104 may transmitting the first signal to the first device. Accordingly, a base unit 104 may configure device-to-device transmission.

In another embodiment, a remote unit 102 (e.g., pedestrian UE ("P-UE")) may generate a sequence. The remote unit 102 may select a resource from a resource pool. The remote unit 102 may also transmit the sequence on the resource. The transmission of the sequence on the resource may indicate a behavior of the remote unit 102. Accordingly, a remote unit 102 may transmit device-to-device transmissions.

In certain embodiments, a remote unit 102 (e.g., vehicle UE ("V-UE")) may, on each resource within a resource pool, detect whether a sequence is transmitted. Transmission of the sequence within the resource pool may indicate a behavior of a device that transmits the transmission of the sequence. Accordingly, a remote unit 102 may receive device-to-device transmissions.

Figure 2:
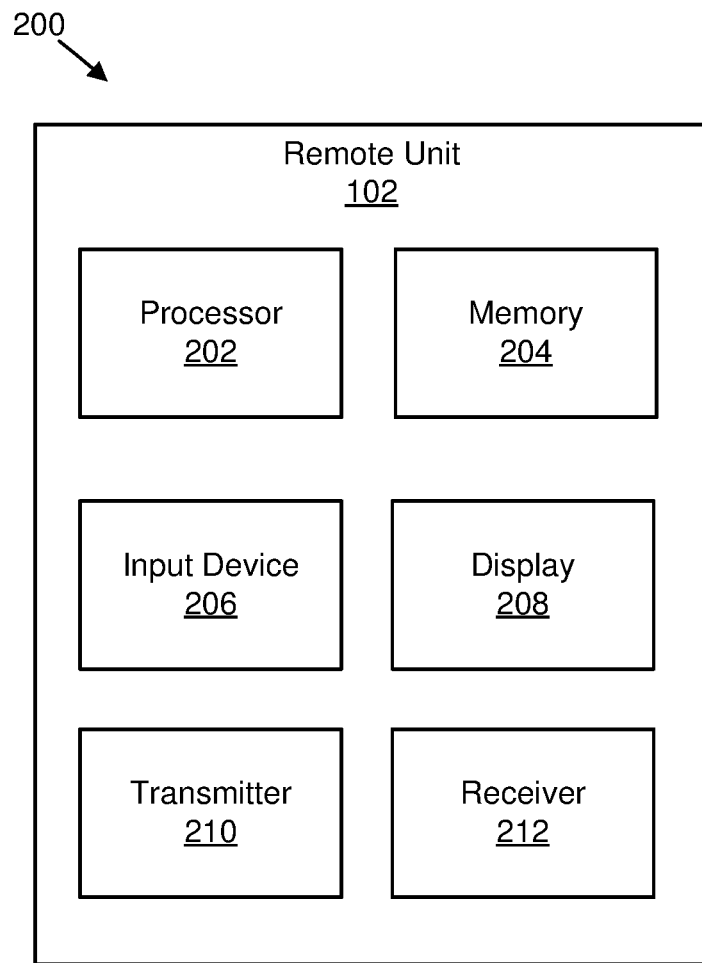
FIG. 2 is a schematic block diagram illustrating one embodiment of an apparatus that may be used for device-to-device transmission.

FIG. 2 depicts one embodiment of an apparatus 200 that may be used for device-to-device transmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may generate a sequence. In some embodiments, the processor 202 may select a resource from a resource pool.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit a sequence on a resource. The transmission of the sequence on the resource indicates a behavior of the remote unit 102. In certain embodiments, the receiver 212 may be used to receive data. In one embodiment, the receiver 212, on each resource within a resource pool, detects whether a sequence is transmitted. Transmission of the sequence within the resource pool may indicate a behavior of a device that transmits the transmission of the sequence. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
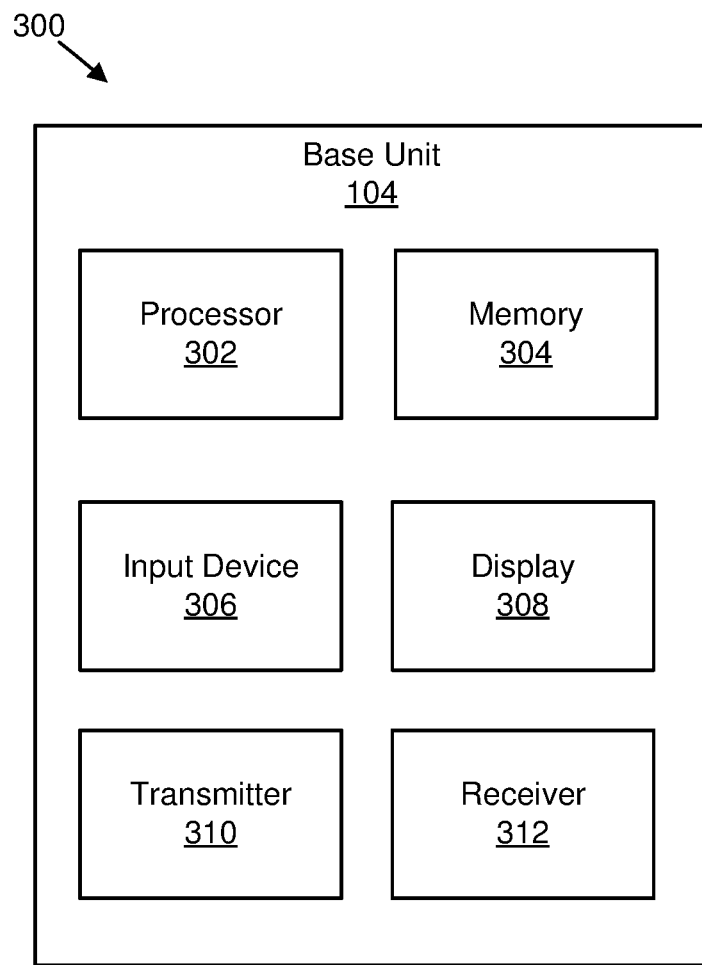
FIG. 3 is a schematic block diagram illustrating one embodiment of an apparatus that may be used for configuring device-to-device transmission.

FIG. 3 depicts one embodiment of an apparatus 300 that may be used for configuring device-to-device transmission. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The processor 302 is used to generate a first signal indicating a first sequence and a first resource pool. Transmission of the first sequence within the first resource pool indicates a behavior of a first device that transmits the transmission of the first sequence. The first resource pool is configured for use by multiple devices. The transmitter 310 is used to transmit the first signal to the first device. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
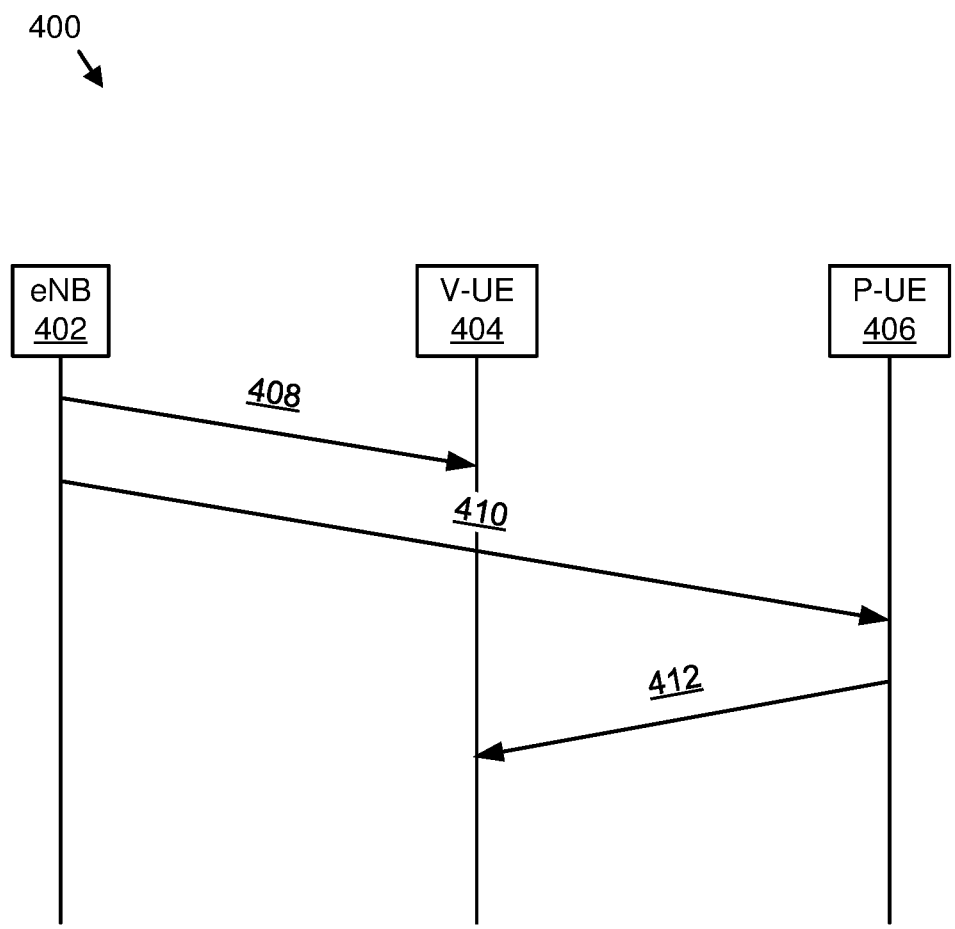
FIG. 4 illustrates one embodiment of communications for configuring device-to-device transmission.

FIG. 4 illustrates one embodiment of communications 400 for configuring device-to-device transmission. Specifically, communications 400 between an eNB 402, a V-UE 404, and a P-UE 406 are illustrated. A first communication 408 and a second communication 410 are sent from the eNB 402 and are used to configure the V-UE 404 and the P-UE 406; however, in certain embodiments, the V-UE 404 and/or the P-UE 406 may be pre-configured, configured via a specification, and so forth. In some embodiments, the first communication 408 and/or the second communication 410 may be used to configure multiple V-UEs and/or multiple P-UEs to use a common sequence and/or to use a common resource for communicating the common sequence.

The first communication 408 and/or the second communication 410 may include information regarding a time-frequency resource for transmission of the third communication 412. Specifically, in certain embodiments, the information may indicate that the third communication 412 is to be transmitted in a gap of a subframe within a resource pool used for transmission (e.g., the last symbol of the subframe). This gap may be defined in each D2D subframe for the purpose of avoiding the possible collision between D2D signal transmissions and following cellular transmissions, such as when D2D transmissions and cellular transmissions are sharing the same carrier and using different transmission timing. However, for V2V and V2X transmission, a dedicated carrier frequency for intelligent traffic systems ("ITS") may be used so that the gap may not be necessary. In embodiments in which V2X and/or D2D transmissions share the same carrier frequency with cellular transmissions, the gap in one subframe for V2V/V2X usage may not be necessary when this subframe is followed by another subframe also for V2V/V2X usage. This case may occur in embodiments in which the resource pool design in the time domain for V2V/V2X is consecutive in order to decrease the time to switch between V2V/V2X transmission/receiving and cellular transmission.

The first communication 408 may include information regarding a V2V resource pool and/or the second communication 410 may include information regarding the P-UE 406 transmission resource pool. In certain embodiments, the first communication 408 may also include information regarding the P-UE 406 transmission resource pool. In some embodiments, the first and second communications 408 may be one communication that is sent to the V-UE 404 and the P-UE 406 that includes the V2V resource pool and the P-UE 406 transmission resource pool.

In certain embodiments, the P-UE 406 transmission resource pool (e.g., time-frequency resource) may be combined and/or shared with the V2V resource pool because the purpose of a P-UE 406 transmission is to let the V-UE 404 detect the existence of the P-UE 406. In some embodiments, when the V2V resource pool is configured by the eNB 402 or preconfigured, the P-UE 406 transmission resource pool may be similarly configured or preconfigured. In various embodiments, a bitmap (or other mapping) may be used to indicate whether the gap of one subframe within the V2V resource pool is used for the P-UE 406 transmission. In certain embodiments, a periodicity and/or initial subframe offset within the V2V resource pool may be configured by the eNB 402 or preconfigured.

The first communication 408 and/or the second communication 410 may include information regarding a signal to be transmitted from the P-UE 406 to the V-UE 404. The signal may indicate a sequence. In certain embodiments, the sequence may be a constant amplitude zero autocorrelation ("CAZAC") sequence to facilitate maintaining low peak to average power ratio ("PAPR") requirement in P-UE 406 implementation. In such embodiments, the concrete length of the CAZAC sequence may be configured by RRC signaling, preconfigured, or fixed in a specification. Moreover, each complex value in the sequence may be mapped to one RE. In some embodiments, the generation of a CAZAC sequence may be performed by introducing a new root index. In various embodiments, an existing demodulation reference signal ("DMRS") sequence may be used and may be selected by setting fixed values for a Cell-ID, a cyclic shift, and an OCC.

The third communication 412 is sent from the P-UE 406 to the V-UE 404 to provide an indication to the V-UE 404. In various embodiments, the third communication 412 is sent to indicate a behavior of the P-UE 406. For example, in some embodiments, the third communication 412 is sent to indicate that the P-UE 406 is crossing a road and/or in an intersection. As may be appreciated, the behavior may be any suitable behavior of the P-UE 406. By limiting communication from the P-UE 406 to the V-UE 404 to indicating the behavior (e.g., to only indicate the behavior to the V-UE 404), battery power of the P-UE 406 may be conserved.

For example, when the P-UE 406 is crossing a road, the P-UE 406 may transmit a signal indicating a specified sequence that may have been preconfigured, configured by the first and/or second communications 408 and/or 410, or defined by a specification. The P-UE 406 may transmit the signal using a resource pool for P-UE 406 transmission as described above. In one embodiment, the resource pool and/or the signal indicating the specified sequence are common to multiple P-UEs 406. Accordingly, multiple P-UEs 406 may be enabled to transmit the same signal in the same resource to result in a combined signal having a combined gain. By using the same resource pool, resource collision may be avoided. Furthermore, the P-UEs 406 may reduce power consumption and/or improve performance gain by limiting transmissions, such as by limiting transmissions form the P-UEs 406 to the V-UEs 404 to instances in which the P-UEs 406 are crossing the road and/or in an intersection.

In some embodiments, the V-UE 404 may receive the third communication 412, detect a gap (e.g., the last symbol within the P-UE 406 transmission resource pool), and match a received signal of the third communication 412 with a sequence (known by the V-UE 404 through configuration, pre-configuration, or defined in a specification) to determine whether there is a P-UE 406 crossing a road.

Figure 5:
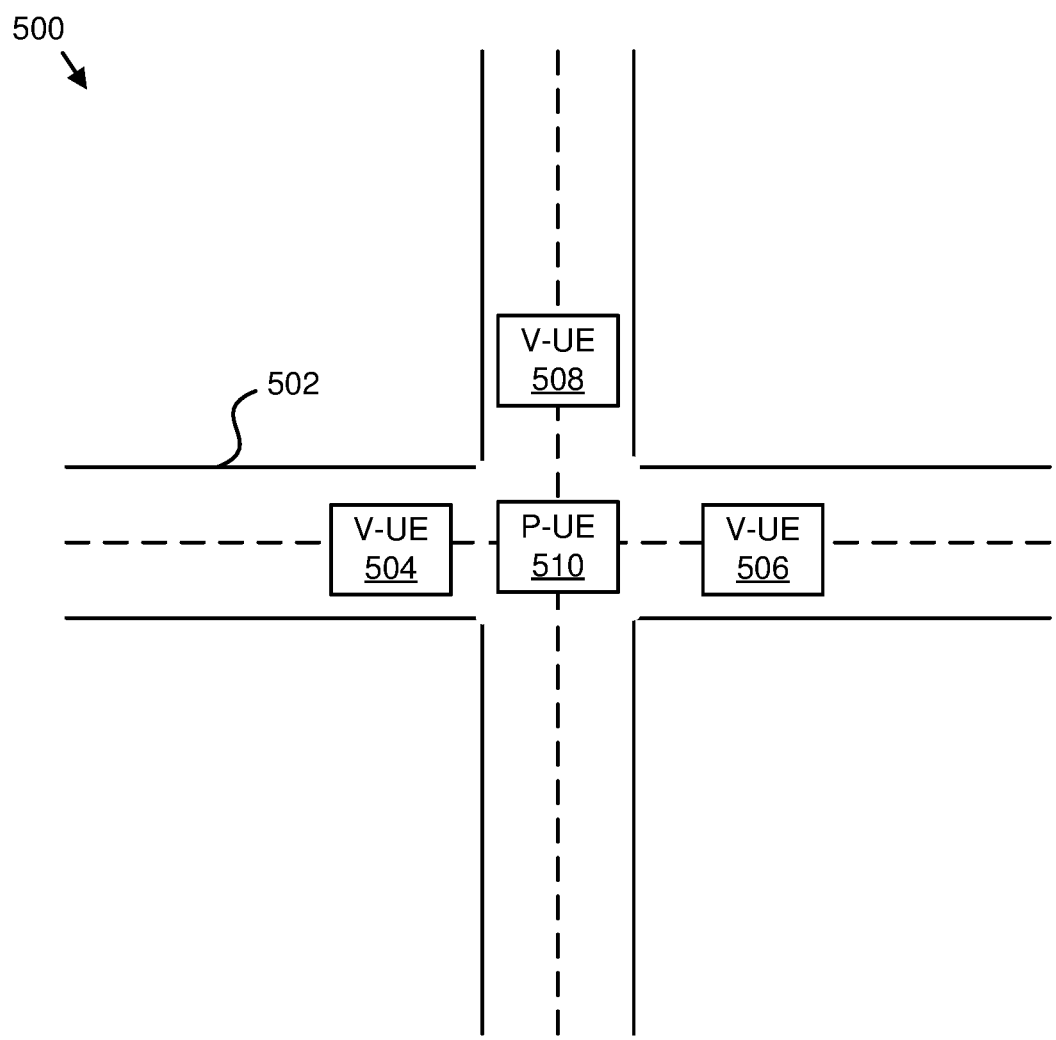
FIG. 5 illustrates one embodiment of an implementation of device-to-device transmission.

FIG. 5 illustrates one embodiment of an implementation 500 of device-to-device transmission. As illustrated, a road 502 may include a first V-UE 504, a second V-UE 506, and a third V-UE 508 traveling thereon. Moreover, a P-UE 510 may cross the road 502. At the time of the P-UE 510 crossing the road 502 and/or just before the P-UE 510 crosses the road 502, the P-UE 510 may send a communication to the first, second, and third V-UEs 504, 506, and 508. The communication may be substantially similar to the third communication 412 described above to indicate to the first, second, and third V-UEs 504, 506, and 508 that the P-UE 510 is about to cross the road 502 and/or is crossing the road 502.

Figure 6:
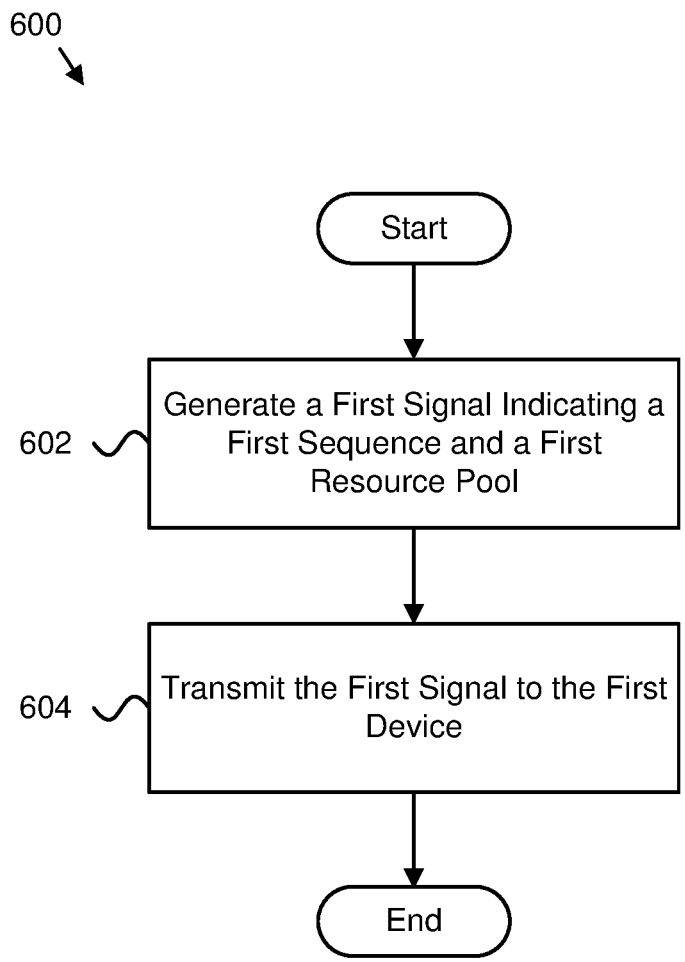
FIG. 6 is a schematic flow chart diagram illustrating one embodiment of a method for configuring device-to-device transmission.

FIG. 6 is a schematic flow chart diagram illustrating one embodiment of a method 600 for configuring device-to-device transmission. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include generating 602 a first signal indicating a first sequence and a first resource pool. In such an embodiment, transmission of the first sequence within the first resource pool indicates a behavior of a first device that transmits the transmission of the first sequence, and the first resource pool is configured for use by multiple devices. The method 600 may also include transmitting 604 the first signal to the first device, and the method 600 may end.

In one embodiment, the method 600 includes generating a second signal for indicating the first sequence and the first resource pool, and transmitting the second signal to a second device. In a further embodiment, the method 600 includes generating a third signal for indicating a second sequence and the first resource pool. In such an embodiment, transmission of the second sequence within the first resource pool indicates a behavior of a third device that transmits the transmission of the second sequence. Moreover, the method 600 may include generating a fourth signal for indicating the first sequence, the second sequence, and the first resource pool. Furthermore, the method 600 may include transmitting the third signal to the third device, and transmitting the fourth signal to the second device. In some embodiments, the first sequence and the second sequence are the same. In certain embodiments, one sequence in each subframe within the first resource pool is transmitted. In some embodiments, more than one sequence in each subframe within the first resource pool is transmitted.

In various embodiments, each resource within the first resource pool includes a gap in a subframe. In certain embodiments, each resource within the first resource pool includes a last symbol in a subframe. In one embodiment, the first resource pool is located in the last symbol in a subframe configured for the second device. In some embodiments, the first sequence is a reference signal. In various embodiments, the behavior includes the first device crossing a road.

Figure 7:
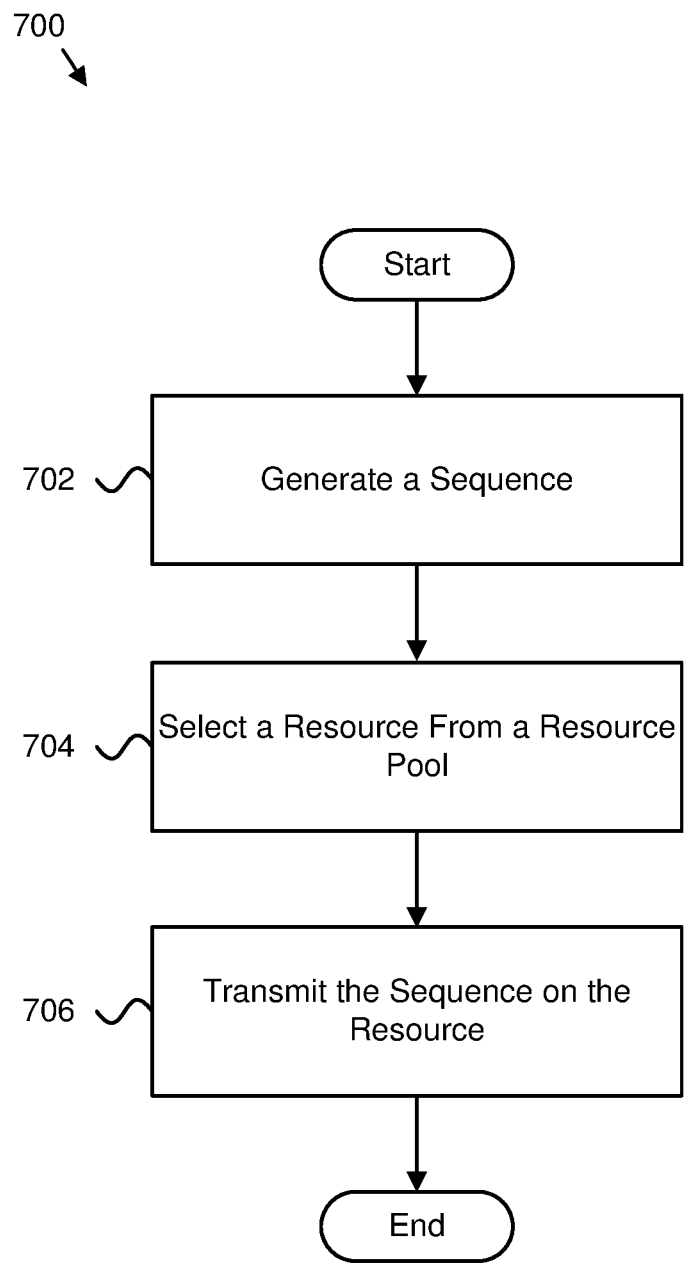
FIG. 7 is a schematic flow chart diagram illustrating one embodiment of a method for transmitting a device-to-device transmission.

FIG. 7 is a schematic flow chart diagram illustrating one embodiment of a method 700 for transmitting a device-to-device transmission. In some embodiments, the method 700 is performed by an apparatus, such as the remote unit 102 (e.g., P-UE). In certain embodiments, the method 700 may be performed by a processor executing program code, for example, a microcontroller, a microprocessor, a CPU, a GPU, an auxiliary processing unit, a FPGA, or the like.

The method 700 may include generating 702 a sequence. The method 700 may also include selecting 704 a resource from a resource pool. The method 700 may include transmitting 706 the sequence on the resource, and the method 700 may end. In one embodiment, the transmission of the sequence on the resource indicates a behavior of an apparatus.

In one embodiment, the method 700 includes receiving a signal for indicating the sequence and the resource pool. In a further embodiment, the method 700 includes selecting the resource randomly from the resource pool. In some embodiments, the sequence is preconfigured. In certain embodiments, the resource pool is preconfigured. In some embodiments, the behavior includes the apparatus crossing a road.

Figure 8:
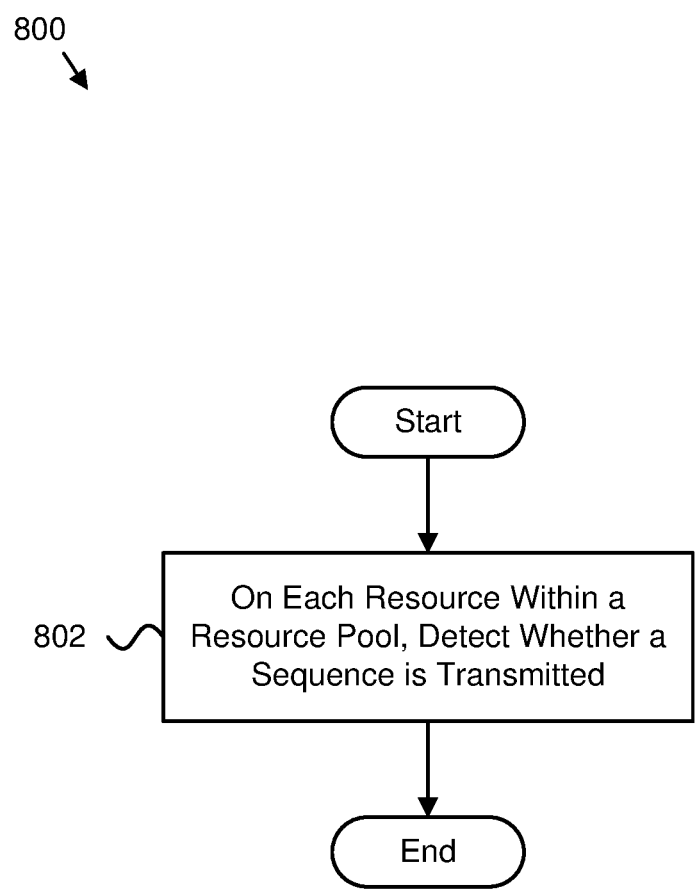
FIG. 8 is a schematic flow chart diagram illustrating one embodiment of a method for receiving a device-to-device transmission.

FIG. 8 is a schematic flow chart diagram illustrating one embodiment of a method 800 for receiving a device-to-device transmission. In some embodiments, the method 800 is performed by an apparatus, such as the remote unit 102 (e.g., V-UE). In certain embodiments, the method 800 may be performed by a processor executing program code, for example, a microcontroller, a microprocessor, a CPU, a GPU, an auxiliary processing unit, a FPGA, or the like.

The method 800 may include, on each resource within a resource pool, detecting 802 whether a sequence is transmitted, and the method 800 may end. In such embodiments, transmission of the sequence within the resource pool indicates a behavior of a device that transmits the transmission of the sequence.

In some embodiments, the method 800 includes receiving a signal indicating the sequence and the resource pool. In certain embodiments, the method 800 includes generating a warning message if the sequence is transmitted. In such embodiments, the warning message may indicate that a pedestrian is crossing a road. In various embodiments, the sequence is preconfigured. In one embodiment, the resource pool is preconfigured. In some embodiments, the behavior includes the device crossing a road.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
  a processor that generates a first signal indicating a first data sequence and a first resource pool, wherein transmission of the first data sequence within the first resource pool indicates information about a first device that transmits the transmission of the first data sequence, the first data sequence is a predetermined sequence that is the same for a plurality of devices, and the first resource pool is configured for use by multiple devices; and
  a transmitter that transmits the first signal to the first device.

2. The apparatus of claim 1, wherein:
  the processor generates a second signal for indicating the first data sequence and the first resource pool; and
  the transmitter transmits the second signal to a second device.

3. The apparatus of claim 2, wherein:
  the processor:
    generates a third signal for indicating a second data sequence and the first resource pool, wherein transmission of the second data sequence within the first resource pool indicates information about a third device that transmits the transmission of the second data sequence; and
    generates a fourth signal for indicating the first data sequence, the second data sequence, and the first resource pool; and
  the transmitter:
    transmits the third signal to the third device; and
    transmits the fourth signal to the second device.

4. The apparatus of claim 3, wherein the first data sequence and the second data sequence are the same.

5. The apparatus of claim 1, wherein one data sequence in each subframe within the first resource pool is transmitted.

6. The apparatus of claim 1, wherein more than one data sequence in each subframe within the first resource pool is transmitted.

7. The apparatus of claim 1, wherein each resource within the first resource pool comprises a gap in a subframe.

8. The apparatus of claim 1, wherein each resource within the first resource pool comprises a last symbol in a subframe.

9. The apparatus of claim 1, wherein the first resource pool is located in the last symbol in a subframe configured for the second device.

10. The apparatus of claim 1, wherein the first data sequence is a reference signal.

11. The apparatus of claim 1, wherein the information comprises the information indicating the first device crossing a road.

12. An apparatus comprising:
  a receiver that, on each resource within a resource pool, detects whether a data sequence is transmitted, wherein transmission of the data sequence within the resource pool indicates information about a device that transmits the transmission of the data sequence and the data sequence is a predetermined sequence that is the same for a plurality of devices.

13. The apparatus of claim 12, wherein the receiver receives a signal indicating the data sequence and the resource pool.

14. The apparatus of claim 12, further comprising a processor that generates a warning message if the data sequence is transmitted.

15. The apparatus of claim 12, wherein the data sequence is preconfigured.

16. The apparatus of claim 12, wherein the resource pool is preconfigured.

17. The apparatus of claim 12, wherein the information comprises the information indicating the device crossing a road.

18. A method comprising:
  on each resource within a resource pool, detecting, by a user equipment, whether a data sequence is transmitted, wherein transmission of the data sequence within the resource pool indicates information about a device that transmits the transmission of the data sequence and the data sequence is a predetermined sequence that is the same for a plurality of devices.

19. The method of claim 18, further comprising receiving a signal indicating the data sequence and the resource pool.

20. The method of claim 18, further comprising generating a warning message if the data sequence is transmitted.

21. The method of claim 18, wherein the data sequence is preconfigured.

22. The method of claim 18, wherein the resource pool is preconfigured.

23. The method of claim 18, wherein the information comprises the information indicating the device crossing a road.

* * * * *